(12) United States Patent
Cutler

(10) Patent No.: US 7,628,436 B1
(45) Date of Patent: Dec. 8, 2009

(54) STOCK TRAILER WITH PROVISION FOR FORWARD INGRESS AND EGRESS OF ANIMAL

(76) Inventor: Rachel Cutler, P.O. Box 291842, Kerrville, TX (US) 78029

( * ) Notice: Subject to any disclaimer, the term of this patent is extended or adjusted under 35 U.S.C. 154(b) by 99 days.

(21) Appl. No.: 11/088,440

(22) Filed: Mar. 24, 2005

(51) Int. Cl.
*B60P 3/04* (2006.01)
(52) U.S. Cl. ............... 296/24.31; 119/412; 119/523
(58) Field of Classification Search ........... 296/24.31, 296/12; 119/412, 413, 523, 453; 410/129, 410/130, 135, 140–142
See application file for complete search history.

(56) References Cited

U.S. PATENT DOCUMENTS

| | | | |
|---|---|---|---|
| 327,305 A | * | 9/1885 | Parker ................. 119/413 |
| 382,934 A | * | 5/1888 | Arms ................... 119/412 |
| 5,887,928 A | * | 3/1999 | Fenske ............... 296/24.31 |
| 5,961,171 A | * | 10/1999 | Iijima ................. 296/37.1 |

* cited by examiner

*Primary Examiner*—Dennis H Pedder

(57) ABSTRACT

A conveyance for the transportation of a multiple livestock is manufactured as a stock trailer in the slant configuration having provided therein a rear interior panels and forward interior panels. The forward and rear interior panels are rotatable about their respective mounting poles and the forward interior panels slide back and forth to facilitate loading into and unloading from the trailer of a plurality of horses. In particular, the forward interior panels and the rear interior panels are cooperatively adapted to enable the forward loading of the horses and, further, to enable the forward unloading to and from the trailer, respectively.

8 Claims, 5 Drawing Sheets

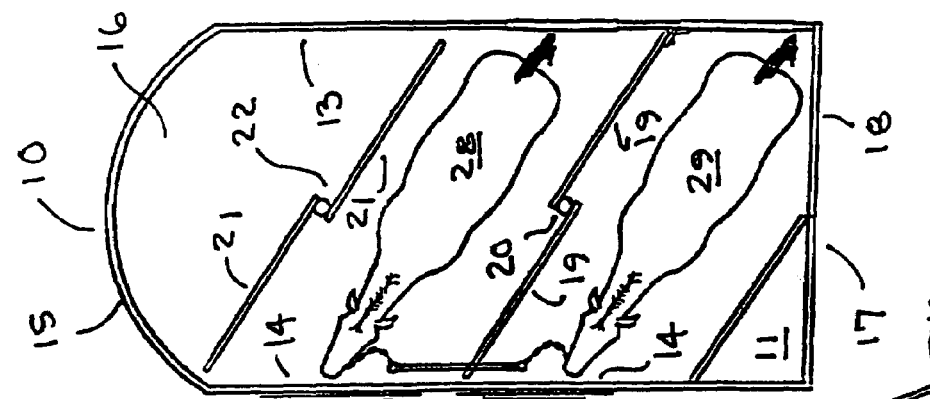
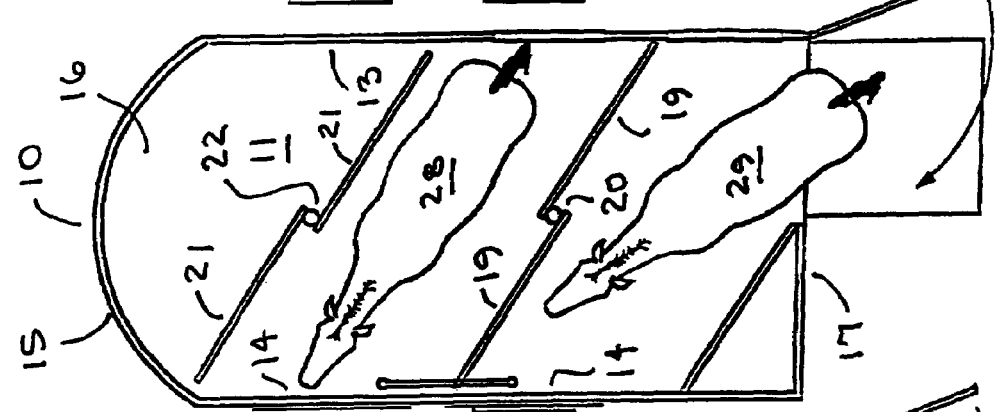
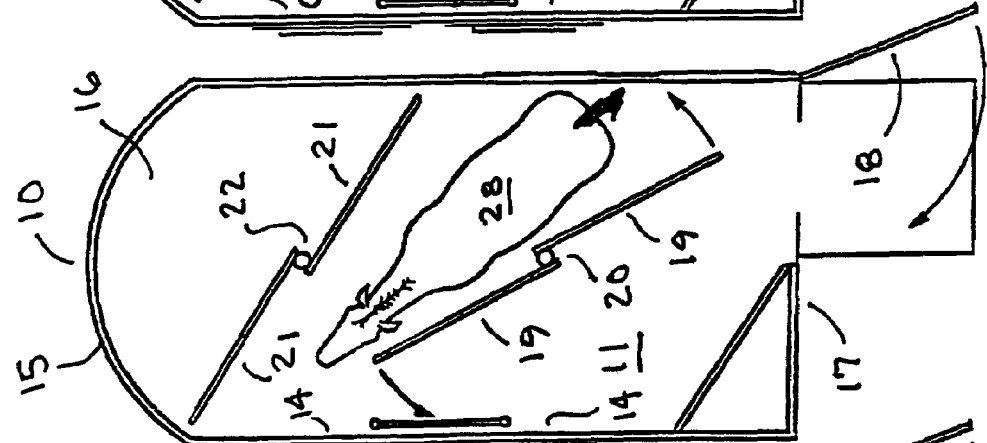
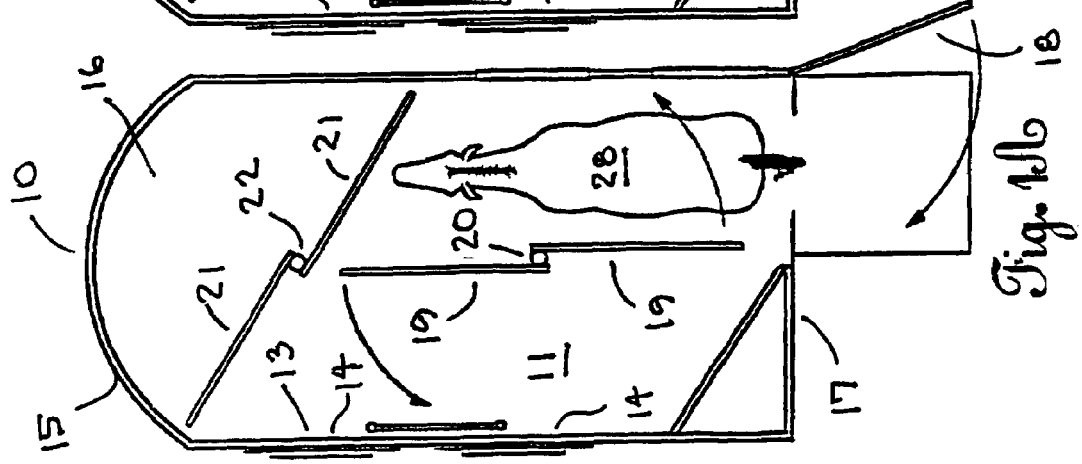

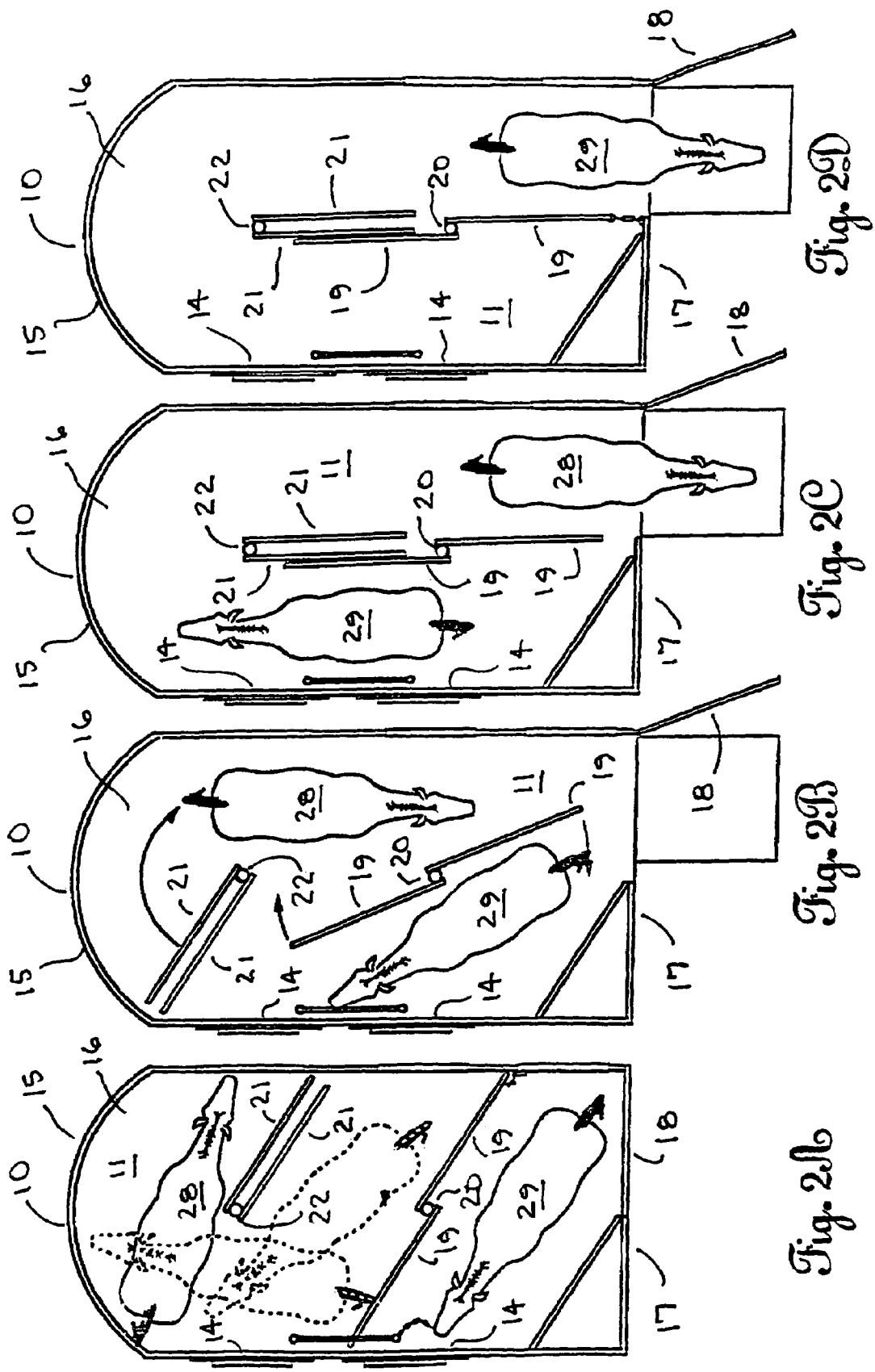

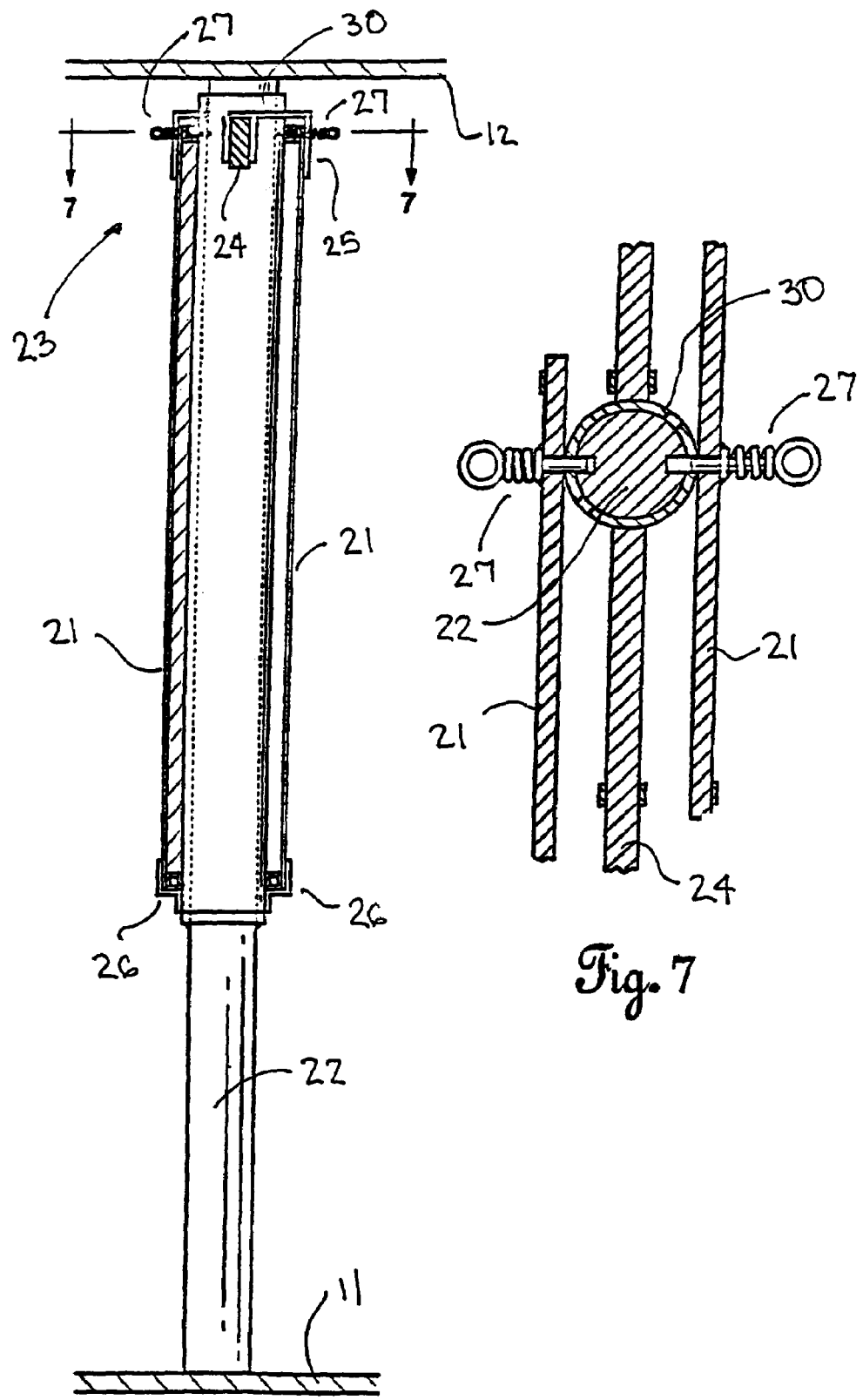

US 7,628,436 B1

STOCK TRAILER WITH PROVISION FOR FORWARD INGRESS AND EGRESS OF ANIMAL

FIELD OF THE INVENTION

The present invention relates to animal husbandry. More particularly, the invention relates to a slant trailer particularly adapted for the transportation of multiple horses, said trailer having provision for both forward ingress and forward egress of the horses.

BACKGROUND OF THE INVENTION

The stock trailers for toe behind a motor vehicle have long been common place on farms and ranches. As a result, many adaptations have been proposed to make such trailers more suitable for particular purposes. For example, a slant trailer is well known for its ability to carry multiple horses in separated areas of the trailer. Unfortunately, while a slant trailer is generally amenable to the loading of horses it is necessary when unloading horses to force the horses to walk backward out the access door. As is appreciated by those familiar with this task, horses in particular are extremely adverse to walking where they cannot see and, as a consequence, often become extremely agitated when being unloaded from the typical slant trailer. In the end, the advantages of the slant trailer can be easily outweighed by the high risk of injury to both horse and handler.

It is therefore an overriding object of the present invention to improve over the prior art providing an otherwise typical stock trailer in the slant configuration with an adaptation allowing for the forward unloading as well as loading for transported horses. Additionally, it is an object of the present invention to provide such an improvement that may also be readily manufactured and economically implemented. Finally, it is an object of the present invention to provide such an improvement without compromise of available space within the trailer.

SUMMARY OF THE INVENTION

In accordance with the foregoing objects, the present invention—a conveyance for the transportation of a plurality of livestock—generally comprises a stock trailer in the slant configuration having provided therein a plurality of rear interior panels and a plurality of forward interior panels. The forward and rear interior panels are rotatable about their respective mounting poles and the forward interior panels slide back and forth to facilitate loading into and unloading from the trailer of a plurality of horses. In particular, the forward interior panels and the rear interior panels are cooperatively adapted to enable the forward loading of the horses and, further, to enable the forward unloading to and from the trailer, respectively.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein:

FIGS. 1A through 1D show, in a series of top plan views, the preferred method for loading horses into the preferred embodiment of the stock trailer (shown with the roof portion cut away) of the present invention;

FIGS. 2A through 2D show, in a series of top plan views, the preferred method for unloading horses from the stock trailer (shown with the roof portion cut away) of FIGS. 1A through 1D;

FIG. 6 shows, in a cross-sectional view taken through line 6-6 of FIG. 5, various details of the interior panels of FIG. 3; and FIG. 7 shows, in a cross-sectional view taken through line 7-7 of FIG. 6, various additional details of the interior panels of FIG. 3.

DETAILED DESCRIPTION OF THE PREFERRED EMBODIMENT

Figure 3:
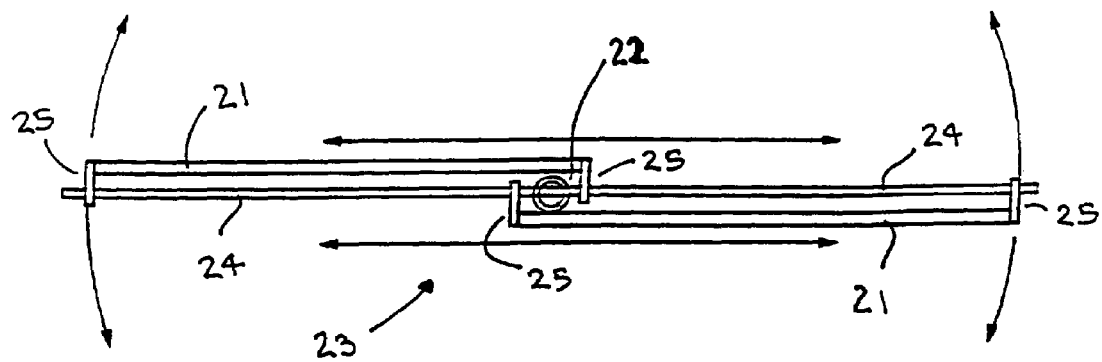
FIG. 3 shows, in a top plan view, the preferred embodiment of the forward interior panels of the stock trailer of FIGS. 1A through 1D.
Figure 4:
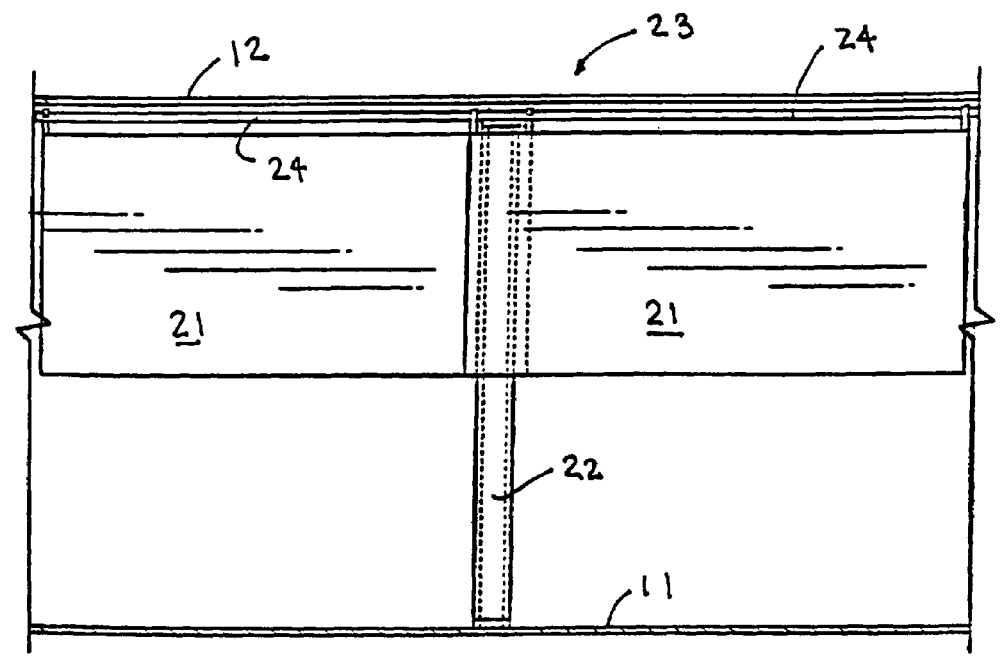
FIG. 4 shows, in a side elevational view, the interior panels of FIG. 3.

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Referring now to the figures, the preferred embodiment of the present invention is shown to generally comprise a stock trailer 10 in the slant configuration having provided therein a plurality of rear interior panels 19 and a plurality of forward interior panels 21. As will be better understood further herein, the rear interior panels 19, which are dependently supported upon a mounting pole 20, and the forward interior panels 21, which are dependently supported on a separate mounting pole 22, are rotatable about their respective mounting poles 20, 22 to facilitate loading into and unloading from the trailer 10 of a plurality of horses 28, 29. In particular, the forward interior panels 21 and the rear interior panels 19 are cooperatively adapted to enable the forward loading of the horses 28, 29, as detailed in FIGS. 1A though 1D. Additionally, the rear interior panels 19 and forward interior panels 21 are further cooperatively adapted to enable the forward unloading from the trailer 10 of the horses 28, 29, as detailed in FIGS. 2A though 2B.

As shown in FIG. 1A, the forward interior panels 21 of the present invention are adapted to form a partition between the compartment 16 in the front portion 15 of the stock trailer 10 and the desired position for the front horse 28. To begin loading of the trailer 10, the forward interior panels 21 and the rear interior panels 19 are positioned as shown in FIG. 1A and the front horse 28 is led through the access door 18 in the rear 17 of the trailer 10. The rear interior panels 19 are then rotated, as shown in FIG. 1B into the position depicted in FIG. 1C and the rear horse 29 is led into its position in the rear 17 of the trailer 10. The horses may then be conventionally tied, as shown in FIG. 1D and the access door 18 through the rear 17 of the trailer 10 may be closed to secure the horses 28, 29 within the trailer 10.

To unload the horses 28, 29 from the trailer 10 of the present invention, one of the forward interior panels 21 is translated into side-by-side position with the other forward interior panel 21 as depicted in FIG. 2A. With the panels 21 so positioned, the front horse 28 is able to walk forward into the front compartment 16 as also shown in FIG. 2A. Once the front horse 28 is in position in the front compartment 16, both forward interior panels 21 are translated into the position shown in FIG. 2B, thereby providing a barrier between the horses 28, 29 after rotation of the rear interior panels 19 as also shown in FIG. 2B. As shown in FIG. 2C, the front horse 28 may then continue to walk forward out of the access door 18 in the rear 17 of the trailer 10. The forward interior panels 21 may then be rotated as shown in FIGS. 2C and 2D allowing the rear horse 29 to also walk forward through the front compartment 16 and then out the access door 18 in the rear 17 of the trailer 10.

Referring now to FIGS. 3 through 6, various details of the forward interior panels 21 are depicted to illustrate the capability of the panels 21 to both translate back and forth on a sliding mechanism 23 while also being rotatable about their mounting pole 22. As shown in the figures, the forward interior panels 21 are preferably suspended from a top bar 24 rotatably affixed to the upper portion of mounting pole 22 extending between the floor 11 and ceiling 12 of the trailer 10 by a sleeve 30 over the upper portion of the mounting pole 22. In particular, a plurality of hanging brackets 25 are preferably affixed to the upper edges of each panel 21 and hung over the top bar 24. To stabilize the panels 21 and to secure them in place, a lower bracket 26 is affixed to each side of the lower portion of the sleeve 30. Although those of ordinary skill in the art will recognize in light of this exemplary disclosure that other substantially equivalent embodiments may be fashioned, the sliding mechanism 23 as described provides a simple and cost effective means for translation of the panels 21 while also enabling their rotation about the mounting pole 22.

Figure 5:
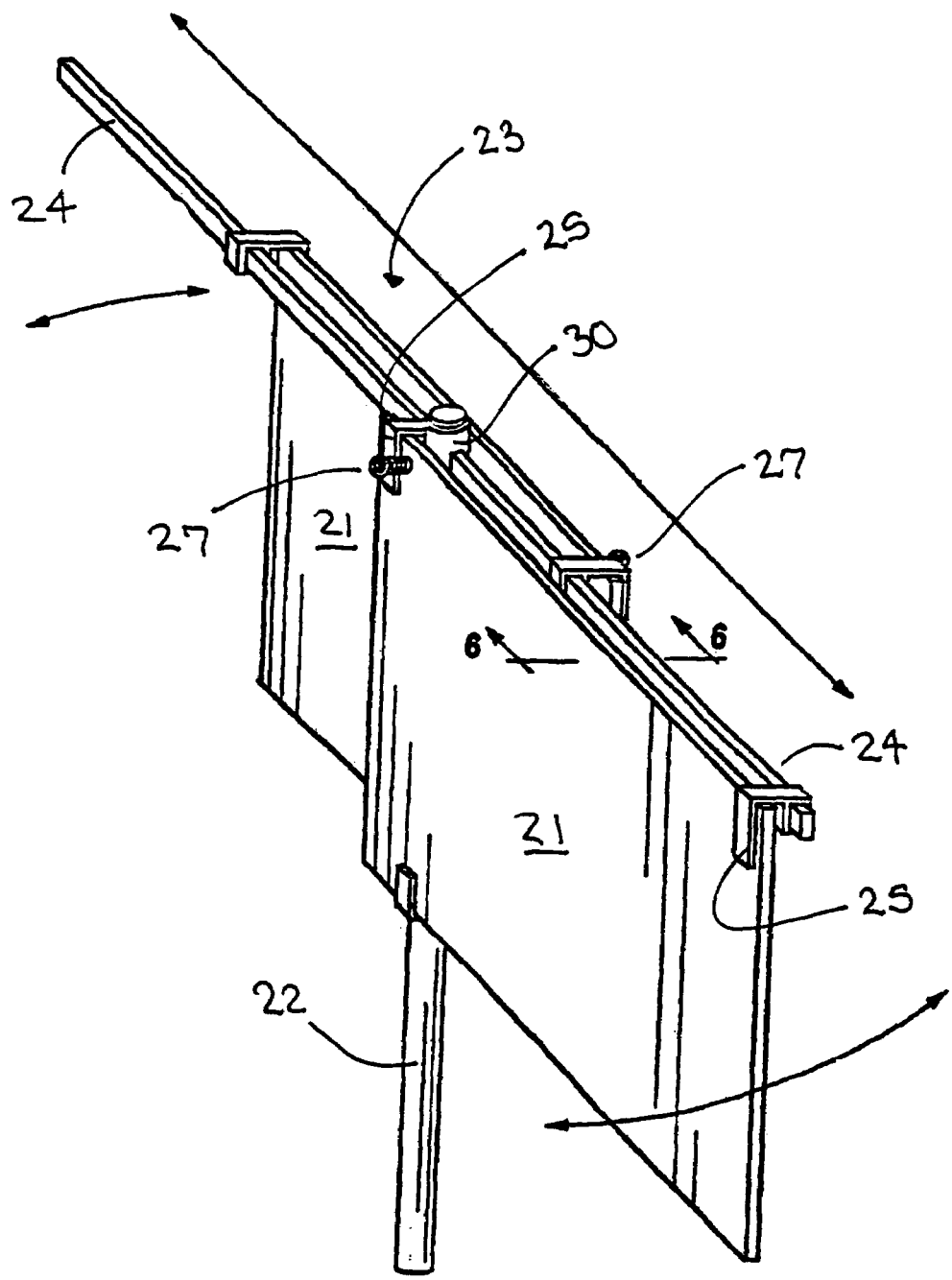
FIG. 5 shows, in a perspective view, the interior panels of FIG. 3.

Referring to FIGS. 5 through 7, there is shown the preferred embodiment for rotation locks 27 to be utilized with the rotating and sliding panels 21. As shown in the figures, the rotation locks 27 each preferably comprise a spring loaded pin adapted to penetrate the sleeve 30 and engage one of a plurality of slots provided about the mounting pole 22. In this manner, the sleeve, and consequently the panels 21, are rotationally fixed in a desired position for holding the transported horses 28, 29 in place. Additionally, this embodiment of the rotation locks also serves to secure the panels 21 in their fully extended position.

Finally, it is to be understood that the rear interior panels 19 may be rotatably mounted to their mounting pole 20 in the manner described with respect to the forward interior panels 21 or the mounting pole 20 itself may be rotatable within the trailer 10 or any other suitable means may be provided.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, those of ordinary skill in the art will recognize that the hanging brackets 25 may be provided with rollers or the like if desired and that the trailer 10 should be provided with all of the customary features and accessories such as, for example, tack storage space, escape doors 14 through one of the side walls 13, conventional tie bars and the like.

Additionally, it will be recognized that the forward interior panels 21 may be made to slide back and forth without rotational capability. In this manner, construction is simplified with only slight sacrifice of access within the trailer 10. In any case, because the scope of the present invention is much broader than any particular embodiment, the foregoing detailed description should not be construed as a limitation of the scope of the present invention, which is limited only by the claims appended hereto.

What is claimed is:

1. A conveyance for the transportation of a plurality of livestock, said conveyance comprising:
    a trailer generally configured to hold two animals in the slant position;
    a first set of panels and a second set of panels mounted within said trailer for positioning the animals in place within said trailer; and
    wherein:
    said first and said second sets of panels are rotatable within said trailer about a point interior said trailer, said point being a first distance from a first side wall of said trailer and a second distance from a second side wall of said trailer;
    said first distance is sufficiently great as to allow passage between said point and said first wall of a held animal;
    said second distance is sufficiently great as to allow passage between said point and said second wall of a held animal;
    each panel of said second set of panels is translatable into a position to the side of the other panel of said second set of panels; and
    said panels of said second set of panels are suspended from a bar rotatably affixed atop a mounting pole extending from the floor of said trailer to the ceiling of said trailer.

2. The conveyance as recited in claim 1, wherein said panels of said second set of panels are suspended from said bar by a plurality of hangers.

3. A conveyance for the transportation of a plurality of livestock, said conveyance comprising:
    a trailer generally configured to hold two animals in the slant position;
    a first set of panels and a second set of panels mounted within said trailer for positioning the animals in place within said trailer; and
    wherein:
    said first and said second sets of panels are rotatable within said trailer;
    each panel of said second set of panels is translatable into a position to the side of the other panel of said second set of panels;
    said panels of said second set of panels are suspended from a bar rotatably affixed atop a mounting pole extending from the floor of said trailer to the ceiling of said trailer; and
    said bar is affixed to a sleeve rotatably positioned about the upper portion of said mounting pole.

4. The conveyance as recited in claim 3, wherein said sleeve is provided with a locking mechanism for selectively preventing rotation about said mounting pole of said sleeve.

5. The conveyance as recited in claim 4, wherein said locking mechanism comprises a locking pin.

6. The conveyance as recited in claim 5, wherein said locking pin is spring loaded.

7. The conveyance as recited in claim 4, wherein said sleeve is provided with a plurality of locking mechanisms.

8. The conveyance as recited in claim 7, wherein said locking mechanism are adapted to selectively prevent translation of said panels of said second set of panels.

* * * * *

UNITED STATES PATENT AND TRADEMARK OFFICE
CERTIFICATE OF CORRECTION

PATENT NO.       : 7,628,436 B1                                    Page 1 of 1
APPLICATION NO.  : 11/088440
DATED            : December 8, 2009
INVENTOR(S)      : Rachel Cutler It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 494 days.

Signed and Sealed this

Twenty-first Day of December, 2010

David J. Kappos
*Director of the United States Patent and Trademark Office*